Figure 1:
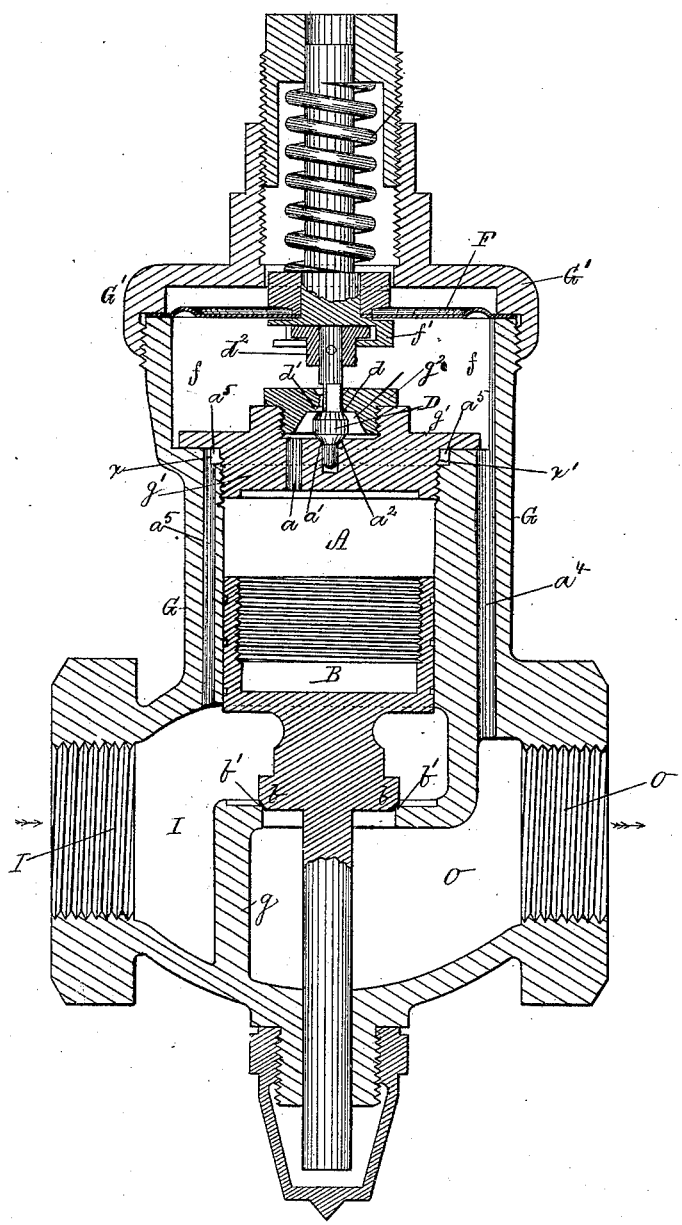

(No Model.) 2 Sheets—Sheet 1.

N. C. LOCKE.
PRESSURE REGULATOR.

No. 448,443. Patented Mar. 17, 1891.

Witnesses.
Lauritz N. Möller
John R. Snow

Inventor
Nathaniel C. Locke
by his attorneys
Magnadis & Beach (No Model.) 2 Sheets—Sheet 2.
N. C. LOCKE.
PRESSURE REGULATOR.
No. 448,443. Patented Mar. 17, 1891.
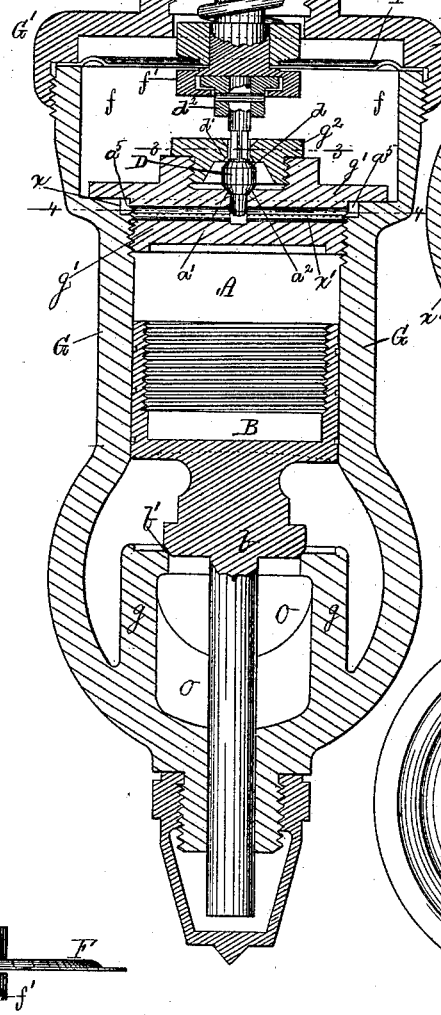
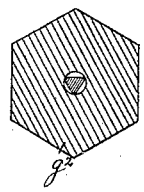
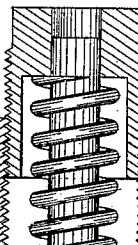
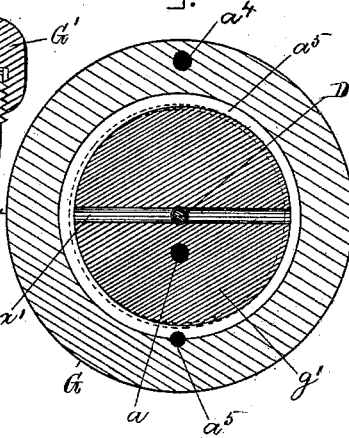
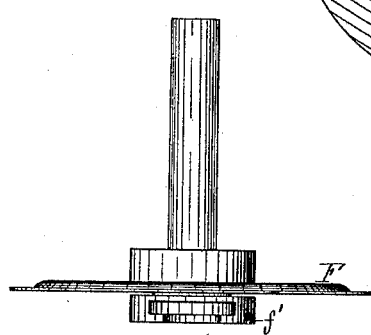
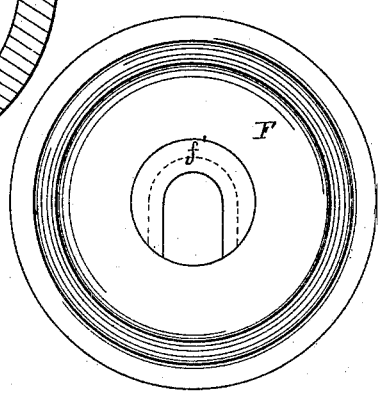
Witnesses.
Lauritz N. Möller
John R. Snow
Inventor.
Nathaniel C. Locke
by his attorneys
Magradier & Beach

UNITED STATES PATENT OFFICE.

NATHANIEL CHASE LOCKE, OF SALEM, MASSACHUSETTS, ASSIGNOR TO LOCKE BROTHERS, OF SAME PLACE.

PRESSURE-REGULATOR.

SPECIFICATION forming part of Letters Patent No. 448,443, dated March 17, 1891.

Application filed November 4, 1889. Serial No. 329,180. (No model.)

*To all whom it may concern:*

Be it known that I, NATHANIEL CHASE LOCKE, of Salem, in the county of Essex and State of Massachusetts, have invented a new and useful Improvement in Pressure-Regulators, of which the following is a specification, reference being had to the accompanying drawings, in which—

Figure 1 is a central vertical section. Fig. 2 is a central vertical section at right angles to the section shown in Fig. 1; Fig. 3, a section taken at line 3 3 of Fig. 2; Fig. 4, a section taken at line 4 4 of Fig. 2; Fig. 5, an elevation of a diaphragm provided with one member of a joint by which the diaphragm is connected to the spindle of the auxiliary valve; Fig. 6, a plan of the diaphragm and that member of the joint shown in Fig. 5.

My invention relates to that class of regulators in which the high and low pressure chambers are connected by two passages, one direct and the other indirect, one example of which is shown in my patent, No. 126,444, dated May 7, 1872.

My invention relates to this class of regulators, and it consists in providing a second auxiliary valve, which is controlled by the diaphragm, and which alternates in operation with the usual auxiliary valve, as will be clear from the following description of the preferred form of my regulator shown in the drawings.

In the drawings, I is the inlet from the high-pressure chamber and O the outlet leading to the low-pressure chamber.

F is the diaphragm and $f$ its chamber.

B is the piston of the main valve, the valve proper being marked $b$ and its seat $b'$, and $d$ $d'$ the auxiliary valve and its seat.

In this class of regulators, as heretofore made, the steam or the like filled the high-pressure chamber I and lifted valve $b$, flowing past valve $b$ and its seat $b'$ into the low-pressure chamber O until the pressure in the chamber O reached the desired point. The steam also passes from chamber I through passage $a^5$ and past valve $d$ $d'$ into the diaphragm-chamber $f$, and chamber I also communicated with chamber O through diaphragm-chamber $f$, passages $a^4$ and $a^5$, connecting them with chamber $f$ (for the extra valve $a'$ $a^2$, the valve proper being marked $a'$ and its seat $a^2$, is the main feature of my invention in this combination and was not present in any prior device of this kind,) so that the steam had free access from the high-pressure chamber I to the diaphragm-chamber $f$ until the auxiliary valve $d$ $d'$ was closed, and that valve remained open until the pressure in low-pressure chamber O exceeded that required, when the diaphragm F was raised by the excess of pressure, thereby closing valve $d$ $d'$ and causing pressure to accumulate under valve $d$ and in chamber A until the piston B and valve $b$ closed either wholly or partially, and thereby reduced the pressure in chamber O by stopping the passage of steam from chamber I. It will be seen that the passage $a^5$ would communicate with the chamber A through passage $a$, as well as with the diaphragm-chamber $f$, were it not for the auxiliary valves $d$ $d'$ and $a'$ $a^2$, and in regulators as heretofore made the passage $a^5$ was always open to chamber A, (thereby keeping high-pressure chamber I always open to chamber A;) but the pressure in chamber A was kept below the pressure in high-pressure chamber I by the escape of steam past the auxiliary valve $d$ $d'$ into diaphragm-chamber $f$ and into low-pressure chamber O through passage $a^4$. Hence it was necessary (especially where steam instead of water was to be reduced in pressure) to greatly contract the area of passage $a^5$ in practice, that passage being a mere pin-hole in regulators for reducing steam-pressure. This is a feature which is highly objectionable and which I remedy wholly by controlling passage $a^5$ by my extra valve $a'$ $a^2$, and hence I am able to make the passage $a^5$ of any convenient size, for, as will be clear from Figs. 1 and 2, no steam can flow through passage $a^5$ while the diaphragm F holds the valve $a^2$ on its seat $a'$, and consequently the pressure in chamber A and on the upper end of piston B cannot be greater than the pressure in diaphragm-chamber $f$ and low-pressure chamber O, the pressure being manifestly the same in all three chambers A, $f$, and O by reason of the passages $a^5$ and $a^4$, so long as valve $a'$ $a^2$ is closed and valve $d$ $d'$ open; but the valve $d$ $d'$ is held open and valve $a'$ $a^2$ closed until the pressure in the diaphragm-chamber $f$ (and also in low pressure-chamber O and in chamber A, above piston B) exceeds slightly the desired point, when the excess of pressure in diaphragm-chamber $f$ (and chambers O and A) moves the diaphragm F, thereby closing valve $d\ d'$ and opening valve $a\ a'$, when the pressure in chamber A at once rises and forces piston B downward and valve $b$ toward its seat $b'$, thereby closing valve $b\ b'$ either wholly or partially—wholly if the draft on low-pressure chamber O ceases or is very small, but only partially if that draft is large.

One great advantage of my invention is that the valves $a'$ and $d$ will when the low pressure is at the desired point stand both slightly off their seats, and in ordinary operation these valves vibrate slightly, and by a mere slight vibration of these valves and of the diaphragm F controlling them keep the pressure to be regulated far nearer the desired point than was before possible, for in fact the regulation takes effect as soon as the pressure to be regulated begins to rise or fall. This is a marked feature of the practical working of my new regulator, for the diaphragm scarcely moves at all, the current of steam through passage $a^5$ dividing after it has passed valve $a'\ a^2$, and a part passing through passage $a$ into piston-chamber A the moment that a very slight rise of pressure lifts diaphragm F slightly and brings valve $d$ slightly nearer its seat $d'$ and valve $a'$ slightly farther from its seat $a^2$; but the moment that a very slight fall of pressure allows diaphragm F to move slightly in a direction to carry valve $d$ farther from its seat $d'$ and valve $a'$ slightly nearer to its seat $a^2$, then the current of steam through passage $a$ is from chamber A, thereby allowing piston B to be moved slightly upward, and valve $b$ slightly farther from its seat $b'$. In either case the pressure to be regulated is not so much brought back to the desired point, after an appreciable rise or fall, as in other regulators, but is practically prevented from rising or falling appreciably. This combination of a high-pressure and a low-pressure chamber with a diaphragm-chamber and a piston-chamber, so arranged that the current of steam passing from the high-pressure chamber to the low-pressure chamber has two courses, one controlled by the main valve and the other controlled by two valves, is a wholly new principle of operation, so far as I am aware, and so greatly increases the delicacy of operation that it practically prevents any material variation of pressure in the low-pressure chamber. Although I have shown both chambers I and O communicating with chamber F, it is obvious that I need not communicate with chamber F; but as passage $a^4$ is necessary between chambers $o$ and $f$, it is convenient to use it as a passage between chambers A and O.

Having thus described the construction and operation of my regulator and explained the principle of my invention, the combination of the extra valve $a'\ a^2$ with this class of regulators, I will now describe certain details of construction which are new with me and constitute the best form now known to me of my invention. The casing or main body G of my regulator is divided into an inlet I and outlet O by the diaphragm $g$, in the usual way, and is bored to receive piston B, which is of the usual construction. The diaphragm-chamber $f$ is formed in this casing preferably at its upper part and closed by the diaphragm F, which is held in place by the cap G'. The casing G is also separated into chambers A and $f$ by the partition $g'$, and a part of passage $a^5$ is formed in partition $g'$, the most convenient way of doing this being that shown in the drawings by enlarging the diameter of the bore of the casing G at $x$, Figs. 1, 2, and 4, and thereby leaving an annular space between the partition $g'$, which forms a part of passage $a^5$, this annular chamber being connected by a bore $x'$ through partition $g'$, this bore $x'$ communicating with the extra valve $a'\ a^2$, as shown in Figs. 2 and 4. In short, the passage from the high-pressure chamber I to the chamber A above the piston is not direct, as heretofore, but is partly in partition $g'$, the purpose being to bring the valve $a'\ a^2$ controlling this passage close to the auxiliary valve $d\ d'$, which controls the passage from piston-chamber A to diaphragm-chamber $f$, thereby bringing both valves into convenient relation with the diaphragm F, by which both are controlled, and also enabling me to make both valves on one stud. The seat $d'$ of valve $d$ is formed in the cap $g^2$, and the stud D has a button $d^2$ which enters a socket $f'$ on the stem of the diaphragm F.

Having thus described my invention, as well as the preferred form of it, what I claim is—

A casing divided into high and low pressure chambers, a piston-chamber, and a diaphragm-chamber, in combination with a piston-valve, an auxiliary valve which controls the passage between the piston-chamber and the low-pressure chamber, and an additional auxiliary valve which controls the passage between the high-pressure chamber and the piston-chamber, all combined and operating substantially as described.

NATHANIEL CHASE LOCKE.

Witnesses:
EDWARD S. BEACH,
JOHN R. SNOW.